(12) United States Patent
Johnson et al.

(10) Patent No.: US 8,176,740 B2
(45) Date of Patent: May 15, 2012

(54) METHOD OF REFURBISHING A SEAL LAND ON A TURBOMACHINE TRANSITION PIECE AND A REFURBISHED TRANSITION PIECE

(75) Inventors: Jere Allen Johnson, Greenville, SC (US); Prahlad Kalidas, Houston, TX (US)

(73) Assignee: General Electric Company, Schenectady, NY (US)

( * ) Notice: Subject to any disclaimer, the term of this patent is extended or adjusted under 35 U.S.C. 154(b) by 973 days.

(21) Appl. No.: 12/173,581

(22) Filed: Jul. 15, 2008

(65) Prior Publication Data
US 2010/0011774 A1    Jan. 21, 2010

(51) Int. Cl.
*F01D 9/02*    (2006.01)

(52) U.S. Cl. .......... 60/752; 277/370; 277/406; 277/571; 277/572; 277/576; 277/650; 277/940; 29/888.021

(58) Field of Classification Search ................ None
See application file for complete search history.

(56) References Cited

U.S. PATENT DOCUMENTS

| | | | | |
|---|---|---|---|---|
| 5,073,084 | A * | 12/1991 | Hirst | 415/209.3 |
| 5,205,465 | A * | 4/1993 | Bogard et al. | 228/119 |
| 6,546,627 | B1 * | 4/2003 | Sekihara et al. | 29/889.1 |
| 7,222,422 | B2 * | 5/2007 | Gupta et al. | 29/889.1 |
| 2008/0166233 | A1 * | 7/2008 | Johnson et al. | 415/230 |

* cited by examiner

*Primary Examiner* — John J Zimmerman
(74) *Attorney, Agent, or Firm* — Cantor Colburn LLP

(57) ABSTRACT

A method of refurbishing a seal land on a transition piece of a turbomachine includes applying a wear strip to a wall surface of the seal land, and covering the wear strip with a slot protector.

9 Claims, 3 Drawing Sheets

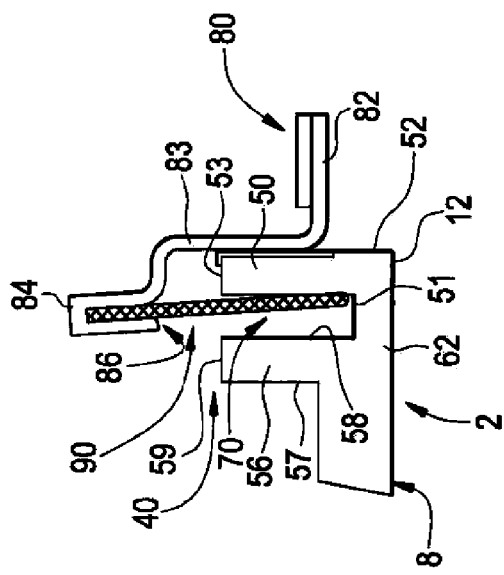

METHOD OF REFURBISHING A SEAL LAND ON A TURBOMACHINE TRANSITION PIECE AND A REFURBISHED TRANSITION PIECE

BACKGROUND OF THE INVENTION

Exemplary embodiments of the invention relate to the art of turbomachines and, more particularly, to a method of refurbishing a seal land on a turbomachine turbine transition piece.

In general, turbomachines, particularly gas turbine engines, combust a fuel/air mixture to release heat energy to form a high temperature gas stream that is channeled to a turbine section via a hot gas path. More specifically, a compressor compresses incoming air to a high pressure. The high pressure air is delivered to a combustion chamber to mix with fuel and form a combustible mixture. The combustible mixture is then ignited to form a high pressure, high velocity gas that is passed through a transition piece into a first stage of a turbine. The turbine converts thermal energy from the high temperature, high velocity gas stream to mechanical energy that rotates a turbine shaft. The turbine shaft is coupled to and drives the compressor and also other machinery such as an electrical generator.

In a typical gas turbine, an air duct surrounds the transition piece and delivers cooling air from the compressor. Joints between the transition piece and the turbine must be properly sealed. That is, the combustion process creates a pressure differential between the hot gases passing into the turbine and the cooling air supplied by the compressor. Without proper sealing between the transition piece and the turbine, compressor cooling air could pass into the turbine resulting in performance and efficiently losses. The seal must be able to withstand the high temperatures of the engine while at the same time remaining flexible so as to accommodate vibrations/deflections and/or travel of the transition piece due to thermal expansion and turbine starts and stops. Over time, the vibrations/deflections and/or travel cause the seal to abrade a seal land portion of the transition piece resulting in wear. When the wear is significant, the seal land must be refurbished.

At present, many turbines are taken off line every 12,000 or so hours of run time or combustion intervals (CI) in order to perform inspection/routine maintenance. During the CI, seal lands are inspected and, if out of tolerance, refurbished. Currently, a seal land is refurbished by applying a new layer of material on the seal land. The new layer of material, typically a nickel based alloy similar to that used in the construction of the transition pieces, is applied in layers by a welding process. While the new layer of material enables the transition piece to return to service, the new layer will erode as fast as, or faster, than the original seal land. Moreover, there are a finite number of refurbishing cycles that can be performed before the seal land will become fatigued. Refurbishing a seal land in this manner is very expensive, requiring up to 300 hours/set, and only extends the life of a transition piece a finite period.

BRIEF DESCRIPTION OF THE INVENTION

In accordance with an exemplary embodiment of the invention, a method of refurbishing a seal land on a transition piece of a turbomachine includes removing the transition piece from the turbomachine, applying a wear strip to a well surface of the seal land, and covering the wear strip with a slot protector.

In accordance with another exemplary embodiment of the present invention, a refurbished transition piece for a turbomachine includes a main body having a first end that extends to a second end through an intermediate portion. A seal land extends about a portion of at least one of the first and second ends. The seal land includes first and second opposing side walls that are joined by a third wall to collectively define a slot. A wear strip is bonded to at least one of the first, second and third walls, and a slot protector is bonded to the wear strip. The slot protector provides abrasion resistance to the seal land.

The above described exemplary embodiments result in enhanced operating efficiencies for turbomachines. That is, the wear strips provide additional wear resistance for the seal land thereby increasing an overall service life of the transition piece. More specifically, by adding a slot protector on the seal land, repeated welding steps previously required to provide renewed wear protection are eliminated. Eliminating welding steps also reduces any thermal cycling, which, over time, will weaken the seal land.

BRIEF DESCRIPTION OF THE DRAWINGS

FIG. 2 is a partial, cross-sectional side view of a refurbished seal land in accordance with an exemplary embodiment of the invention;

FIG. 3 is a partial cross-sectional side view illustrating a first step of refurbishing a seal land in accordance with an exemplary embodiment of the invention;

FIG. 4 is a partial cross-sectional side view of the seal land of FIG. 4 after attachment of a wear strip;

FIG. 5 is a partial cross-sectional side view of the seal land of FIG. 4 after attachment of a slot protector.

DETAILED DESCRIPTION OF THE INVENTION

Figure 1:
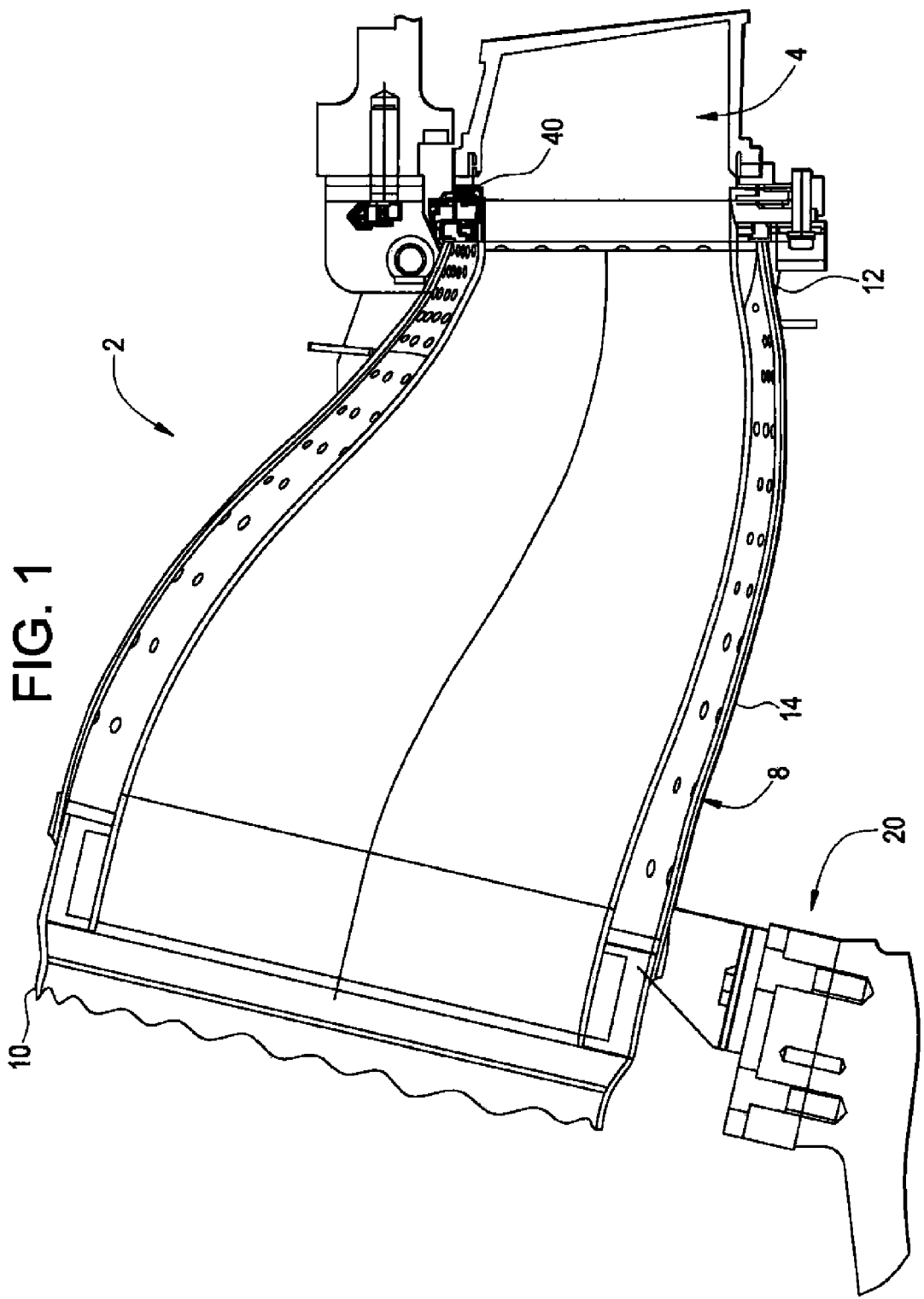
FIG. 1 is a right plan view of a turbomachine transition piece having a refurbished seal land in accordance with an exemplary embodiment of the invention.

With initial reference to FIG. 1, a transition piece (TP) for a turbomachine, for example a gas turbine engine, is indicated generally at 2. Transition piece 2 is operatively connected between a turbine combustor portion (not shown) and a first turbine stage 4. Towards that end, transition piece 2 includes a main body 8 having a first end 10 that extends to a second end 12 through an intermediate portion 14. In accordance with one aspect of the exemplary embodiment, transition piece 2 is formed from a nickel-based alloy such as, but not limited to, NIMONIC® 263. In the exemplary embodiment shown, first end 10 of transition piece 2 is supported upon the gas turbine by a forward mount 20 while second end 12 connects to first turbine stage 4 through a picture frame or seal land 40 establishing a turbine interface (not separately labeled).

As best shown in FIG. 2, seal land 40 includes a first side wall 50 having a first surface 51, a second surface 52 and a third or connecting surface 53. Seal land 40 further includes a second side wall 56 having a first surface 57, a second surface 58 and a third or connecting surface 59. Finally, seal land 40 is shown to include a third wall 62 that connects first and second walls 50 and 56 so as to define a slot 70. As shown, seal land 40 provides an interface between transition piece 2 and first turbine stage 4. That is, first turbine stage 4 is provided with a seal element 80 that operatably engages seal land 40 in order to prevent hot gases passing through transition piece 2 from escaping or leaking from the turbine interface.

In the exemplary embodiment shown, seal element 80 includes a first leg portion 82, a second leg portion 83 and a retaining portion 84. Retaining portion 84 includes a clip section 86 that retains a seal cloth 90 in a desired orientation. That is, seal cloth 90 extends into slot 70 and engages with first wall 50 to establish a seal between transition piece 2 and first turbine stage 4. Seal cloth 90 is preferably formed from a cobalt based alloy, such as, but not limited to, L-605 or L-606, and is flexible so as to enable movement between transition piece 2 and first turbine stage 4 while, at the same time, preventing hot gases from escaping. However, over time, and through a number of combustion intervals, seal cloth 90 will abrade first sidewall 50 creating wear which, if left unchecked, may result in leakage of hot gas from transition piece 2. Towards that end, the seal land 40 must be repaired in order to minimize wear and eliminate potential leak paths.

Reference will now be made to FIGS. 3 through 5 in describing an exemplary method of repairing seal land 40. Initially, transition piece 2 is removed from the gas turbine exposing seal land 40. At this point, first surface 51 is blended to an even thickness so as to have a width of approximately 0.190 inches. After establishing a uniform thickness for slot 70, a wear strip 100 is bonded to first surface 51 of first side wall 50. Wear strip 100 is preferably made from the same material as transition piece 2, e.g., a nickel based alloy such as, but not limited to, NIMONIC® 263, and is welded to first surface 51. Wear strip 100, when properly positioned within slot 70 creates a thickness of between approximately 0.160 inches (4.064 mm) and 0.190-inches (4.826 mm). After attaching wear strip 100, a slot protector 104 is installed. Slot protector 104 is bonded to wear strip 100 so as to restore blueprint dimensions for seal land 40. That is, in accordance with one aspect of the exemplary embodiment, slot protector 104 has a thickness of approximately 0.030-inches (0.762 mm) so as to restore slot 70 to approximately blueprint dimensions such as, a thickness of between approximately 0.190-inches (4.826 mm) and 0.220-inches (5.588 mm). Slot protector 104 in accordance with one aspect of the invention is formed from a cobalt-based alloy such as, but not limited to, L-605 or L-606, and is stitch welded to wear strip 100. By forming slot protector 104 from the same material as seal cloth 90, e.g., L-605 or L-606, additional wear resistance is provided for seal land 40 such that abrasions or other forms of wear are substantially eliminated.

Figure 6:
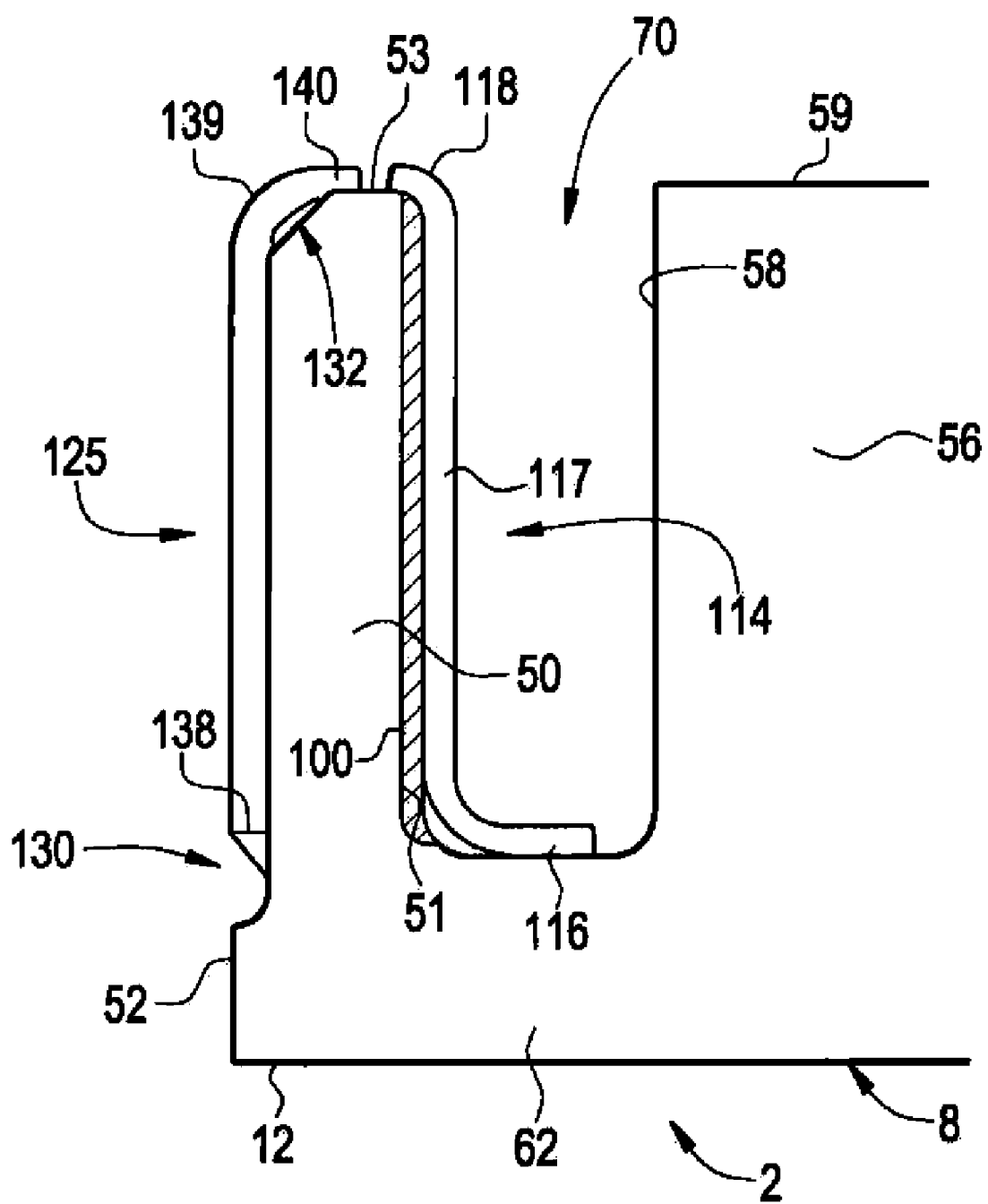
FIG. 6 is a partial cross-sectional side view of a refurbished seal land having a slot protector and an outer wear insert in accordance with another exemplary embodiment of the invention.

Reference will now be made to FIG. 6 in describing a slot protector 114 constructed in accordance with a second embodiment of the present invention. As shown, slot protector 114 is S-shaped and secured to first surface 51 of first sidewall 50. More specifically, slot protector 114 includes a first end 116 that extends across third wall 62 to an intermediate section 117 that runs along first surface 51 before terminating at a second end 118 that extends across a portion of third surface 53. With this arrangement, slot protector 114 not only protects first surface 51 of seal land 40 but also outer surfaces of third wall 62 and third surface 53.

In further accordance with the exemplary embodiment shown, seal land 40 includes an outer wear insert 125 mounted to second surface 52 of first sidewall 50. More specifically, while forming slot 70 so as to have a substantially uniform thickness, a recess 130 is formed in second surface 52 and a chamfer 132 is provided at third surface 53. With this arrangement, outer wear insert 125 is secured to second surface 52 to provide additional wear characteristics between second leg portion 83 of seal element 80 and transition piece 2. That is, outer wear insert 125 includes a first section 138 that extends along second surface 52 to a curved section 139 before terminating in a third section 140 that extends along third surface 53. Outer wear insert 125 is, in accordance with an exemplary embodiment herementioned, formed from a cobalt based alloy such as, but not limited to, L-605 or L-606. With this arrangement, slot protector 114 and outer wear insert 125 provide additional wear resistance for seal land 40 increasing an overall service life of transition piece 2. That is, by adding a slot protector to seal land 40, repeated welding steps to attach the wear strip are eliminated thereby also eliminating thermal cycling which, over time, will weaken seal land 40. The further addition of an outer wear insert serves to even further enhance the overall service life of transition piece 2.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A refurbished transition piece for a turbomachine comprising:
   a main body having a first end that extends to a second end through an intermediate portion;
   a seal land extending about a portion of at least one of the first and second ends, the seal land including first and second opposing side walls joined by a third wall that collectively define a slot, at least one of the first and second opposing side walls and third wall being blended to an even thickness;
   a wear strip formed from a nickel-based alloy welded to at least one of the first, second and third walls; and
   a slot protector formed from a cobalt-based alloy welded to the wear strip, the slot protector providing abrasion resistance to the seal land.

2. The refurbished transition piece according to claim 1, wherein the wear strip is bonded to the at least one of the first, second and third walls by welding.

3. The refurbished transition piece according to claim 1, wherein the slot protector is stitch welded to the wear strip.

4. The refurbished transition piece according to claim 1, wherein the slot protector is a substantially S-shaped slot protector, the substantially S-shaped slot protector is bonded to the wear strip and covers at least two of the first, second and third surfaces of the seal land.

5. The refurbished transition piece according to claim 4, wherein the substantially S-shaped slot protector is bonded to the wear strip and covers three of the first, second and third surfaces of the seal land.

6. The refurbished transition piece according to claim 1, further comprising: an outer wear insert mounted to the seal land.

7. The refurbished transition piece according to claim 6, wherein the outer wear insert is mounted to an external surface of one of the first, second and third surfaces of the seal land.

8. The refurbished transition piece according to claim 7, wherein the outer wear insert is mounted to an external surface of two of the first, second and third surfaces of the seal land.

9. The refurbished transition piece according to claim 1, wherein the slot protector has a thickness of approximately 0.030-inches (0.762 mm).

* * * * *